Dec. 28, 1937.  M. F. SCHULZ  2,103,437
ANTISKID DEVICE
Filed Nov. 13, 1935
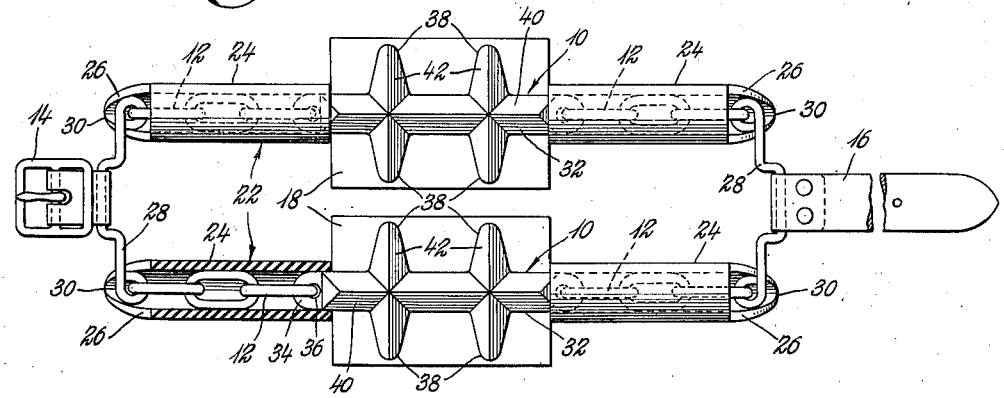
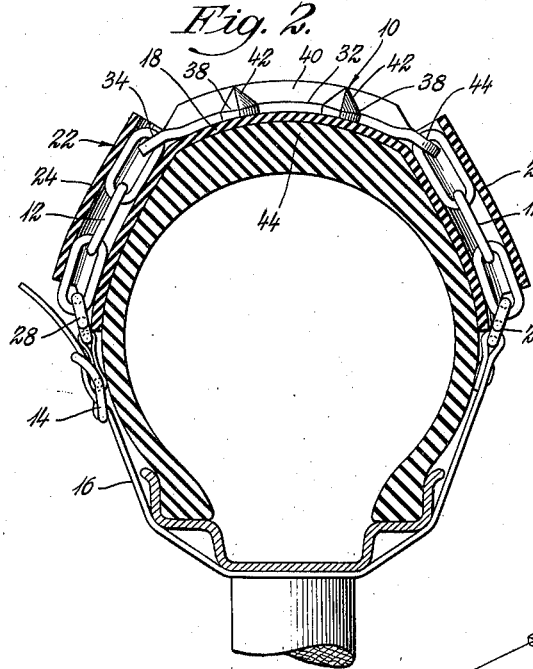
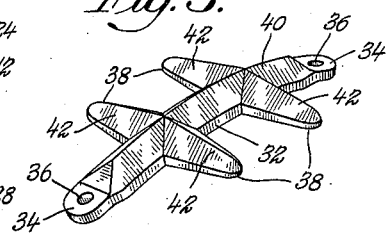
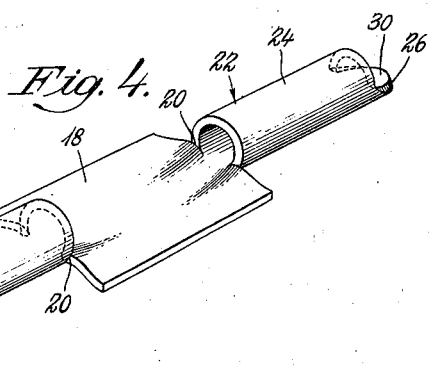
Max F. Schulz.
INVENTOR
BY Victor J. Evans & Co.
HIS ATTORNEYS Patented Dec. 28, 1937

2,103,437

UNITED STATES PATENT OFFICE 2,103,437

ANTISKID DEVICE

Max F. Schulz, Northbrook, Ill.

Application November 13, 1935, Serial No. 49,562

3 Claims. (Cl. 152—14)

My invention relates to automotive vehicles, and has among its objects and advantages the provision of an improved anti-skid attachment for vehicle tires.

In the accompanying drawing:

Fig. 1 is a plan view partly in section;

Fig. 2 is a view illustrating a tire in cross section with my attachment connected therewith;

Fig. 3 is a perspective view of the anti-skid element; and

Fig. 4 is a perspective view of a tire protecting element associated with the lug structure.

In the embodiment selected to illustrate my invention, I make use of anti-skid lugs 10 connected with chains 12 provided with a buckle 14 and a strap 16 for connecting the device with the tire. In Fig. 2, I illustrate the chains 12 as partly encircling the tire with the strap 16 connected with the buckle for firmly drawing the lug structure 10 to the tire. I provide a resilient pad 18 under each lug 10 and enclose the chains 12 in flexible tubing to protect the tire.

In constructing the pads 18, I make cross sectional cuts 20 in a piece of rubber hose 22, and sever the material between the cuts 20 longitudinally and flatten the material (see Fig. 4). Thus, the pads 18 are integrally connected with the tubular extensions 24 which enclose the chains. I prefer to cut the ends of the extensions 24 at an angle 26 to facilitate free movement of the bars 28 connecting the buckle 14 and the strap 16 with the chains 12. The lips 30 provide protection for the tire in the same way as the tubular extensions 24.

Referring to Fig. 3, each of the anti-skid lugs 10 comprises a rib 32 having flattened ends 34 provided with openings 36 for the reception of the end links of the chains 12 associated therewith. Four ribs 38 are formed integrally with the rib 32 and project laterally therefrom. The rib 32 is provided with a tapered bearing surface 40 and the ribs 38 are provided with similar bearing surfaces 42. The rib 32 is of uniform width throughout its entire length, while the ribs 42 taper outwardly. This taper is effective with respect to the width of the lugs as well as their thickness.

In operation, the lug structure performs an efficient function in that the shape and arrangement of the parts provide a self-cleaning construction. The tapered configuration of the rib 32, as well as the angular faces of the ribs 38 and their tapered configuration, tend to loosen the accumulation of snow, ice, etc., through the application of pressure thereto when the weight of the car is carried by the area of the tire to which the device is attached. In addition, the anti-skid devices 10 bear against the resilient pads 18, the pressure modifiable character of which tends to enhance the cleaning characteristics of the lug structure. The yielding nature of the pads 18 tends to break loose accumulations of snow and the like which are packed between the lugs, while the tapered and angular configuration of the latter aids the pads 18 in breaking and loosening the accumulations.

While I have illustrated two anti-skid devices 10 associated as a unit, it will be understood that only one or more than two devices may be employed.

In Fig. 2, I illustrate the rib 32 as being curved slightly to conform to the general curvature of the tire 44. The ribs 38 are arranged at right angles to the rib 32 so that a two-directional function is attained.

Without further elaboration, the foregoing will so fully explain my invention that others may, by applying current knowledge, readily adapt the same for use under various conditions of service.

I claim:

1. An anti-skid device for attachment to a vehicle tire, comprising a lug unit, means for attaching the lug unit to the tire, and resilient means positioned between the lug unit and the tire and having integral extensions housing said means.

2. The combination with an anti-skid device comprising a lug unit having chains connected therewith for attachment to a vehicle tire, of a tire protecting device attached to the lug unit and the chains, said tire protecting device comprising tubular members housing the chains and an integral pad arranged between the lug unit and the tire.

3. In an anti-skid device for attachment to a vehicle tire, a lug unit having chains for connection with the vehicle tire, a cushioning pad extending over one face of the lug, to be positioned adjacent the vehicle tire, said cushioning pad including tubular extensions housing the chains.

MAX F. SCHULZ.